June 18, 1957     J. C. OWEN     2,796,579
ADJUSTABLE ROTATING RECTIFIERS

Filed April 9, 1956     2 Sheets-Sheet 1

INVENTOR.
JOHN C. OWEN
BY *Harry R. Lubeke*
AGENT

June 18, 1957 J. C. OWEN 2,796,579
ADJUSTABLE ROTATING RECTIFIERS
Filed April 9, 1956 2 Sheets-Sheet 2

INVENTOR.
JOHN C. OWEN
BY *Harry R. Lubcke*
AGENT

United States Patent Office 2,796,579
Patented June 18, 1957

2,796,579

ADJUSTABLE ROTATING RECTIFIERS

John C. Owen, San Diego, Calif.

Application April 9, 1956, Serial No. 576,879

14 Claims. (Cl. 321—50)

My invention relates to synchronous rotating rectifiers and particularly to such a rectifier having improved operating characteristics in which the energy output is controlled by altering the coactive structure of the device.

The art has long sought a rotating rectifier in which sparkless operation could be had over a considerable range of operating conditions encountered in practice. Some such operating conditions are brought about unintentionally, such as variations of phase of the alternating electrical energy with respect to the synchronous rotation or vice-versa; while other conditions are desirable for the control of voltage, amperage and/or wattage of the output of the device.

I have found that by providing a rotating rectifier in which the rectifying process is accomplished by the synchronous operation of the equivalent of a double pole double throw switch rather than by the synchronous operation of the equivalent of a single pole double throw switch so long employed by the prior art, it is possible to simultaneously negate the consequences of asynchronous operation and to provide an essentially lossless control of the direct current output of the device. This I accomplish by employing two sources of alternating current to be rectified, such as two separate transformer secondaries per phase, and arrange my rectifier such that asynchronous operation results in the voltages from each secondary being the exact equal and opposite of the other. This, of course, results in no current flow for such operation, hence no sparking.

By spreading the rectifying brushes circumferentially upon segmented rings having insulated and conducting segments I am able to cause any desired amount of transformer secondary voltage bucking at will and thus to control the energy of the output of the rectifier.

An object of my invention is to prevent malfunctioning of a rotating synchronous rectifier occasioned by asynchronous operation.

Another object of my invention is to control the energy output of a rotating synchronous rectifier by means incurring negligible energy loss.

Another object of my invention is to control the energy output of a rotating synchronous rectifier by altering the circumferential length of the brushes bearing upon the segmented rectifying rings.

Another object is to provide a relatively simple and foolproof rotating synchronous rectifier having an adjustable output.

Other objects will become apparent upon reading the following detailed specification and upon examining the related drawings, in which.

Figure 1:
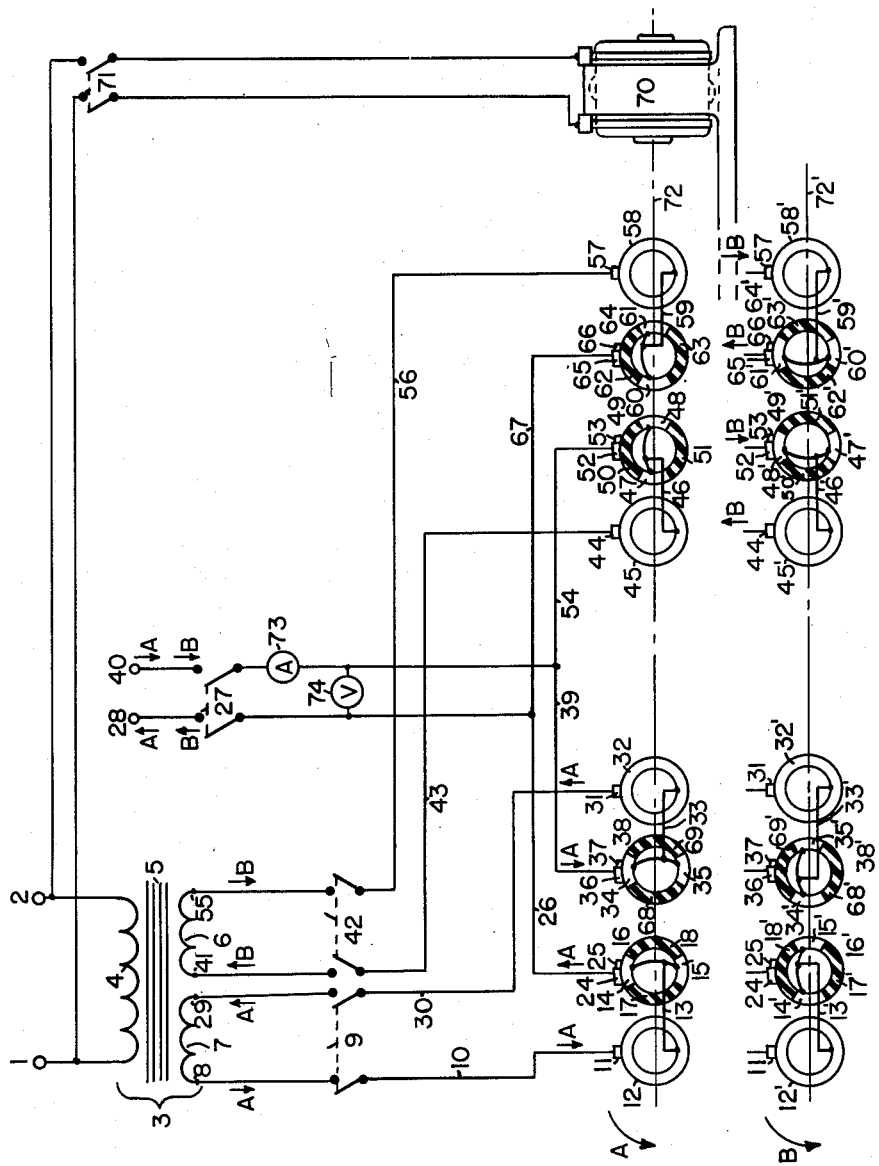
Fig. 1 shows the schematic circuit diagram of my rectifier.

In Fig. 1, terminals 1 and 2 connect to a source of single phase alternating current power to be rectified. For practicing this invention two unconnected such sources per phase are required. These may conveniently be obtained by employing a transformer 3 having primary 4, magnetic core 5, and two secondaries 6 and 7 of equal characteristics. The turns ratio between the primary and each secondary may either be greater or less than one depending upon the ratio of the voltage of the power source to that desired for the load. Also, the primary and/or the secondaries may be provided with taps upon the windings for adjusting the voltage ratio in gross steps.

In Fig. 1 the upper row of rings A represents the total number of rings in my device for full wave single phase rectification. Row B represents the same rings at a different instant of time, when the rings of row A have rotated a quarter turn in the direction of the curved arrows. In row A, terminal 8 of secondary 7 is connected through the left hand blade of switch 9 and through wire 10 to brush 11, which bears upon conductive slip ring 12. Switch 9 is shown in the open position in accordance with drafting symbology but all switches shown are closed in normal operation.

All of the rings shown at A are in one synchronously rotated assembly. Within this assembly wire 13 from fully circumferentially conducting ring 12 connects to conducting segments 14 and 15 upon adjacent segmented ring 16. Segments 17 and 18 are insulated therefrom and serve no conducting purpose. I prefer to construct the insulated segments of the same or of an equivalent conductive material to that used for the conductive segments for uniform wearing qualities and to insulate these segments from the conducting segments by known constructions utilizing washers, tubes and sheets of insulation, but these segments may be made of insulating material as shown diagrammatically in Fig. 1.

Figure 2:
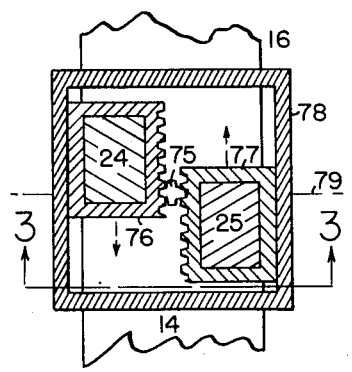
Fig. 2 shows the mechanical arrangement for altering the circumferential length of brushes, in sectional plan.
Figure 3:
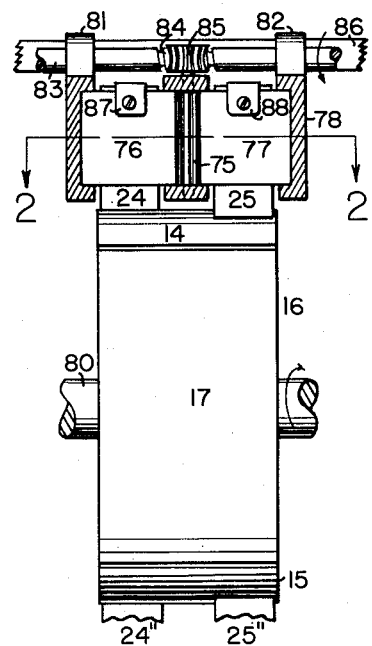
Fig. 3 shows the same in partial section side elevation.
Figure 3:
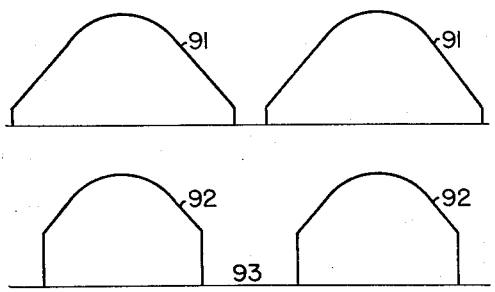

In the position shown at A conducting segment 14 of the segmented ring is in contact with brush elements 24 and 25, a compound structure further illustrated in Figs. 2 and 3. This is to provide desired adjustment but the structure is electrically one brush. Connection is consequently established through wire 26 and switch 27, the left hand blade, to one direct current output terminal 28, to which one connection to the useful load is made. A conductive path has thus been traced from terminal 8 of the transformer to load terminal 28.

In a similar manner, the other terminal 29 of secondary 7 is connected through the right hand blade of switch 9 and wire 30 to brush 31, slip ring 32, wire 33 and conducting segments 34 and 35. At the same instant as before brush elements 36 and 37 are in contact with conducting segment 34 of segmented ring 38 and thus through wire 39 and the right hand blade of switch 27 to the second direct current terminal 40.

As long as brush elements 24, 25 and 36, 37 are in contact with conducting segments 14 and 34, the circuit described will be maintained and current will flow from the alternating source of power to the direct current load. Filter circuits comprised of capacitors across and/or inductors in series with the direct current load may be employed to reduce the ripple of the unidirectional half waves of alternating current to a relatively smooth direct current.

For a usual embodiment I prefer to have two conducting and two insulated segments compose the segmented rings as shown, in which case one mechanical revolution accomplishes rectification of two electrical cycles. The above described connections thus persist for a half electrical cycle and for a quarter turn of the rotating assembly.

Referring now to secondary 6, terminal 41 is connected through the left hand blade of switch 42 and wire 43 to brush 44 bearing upon slip ring 45. A wire 46 from ring 45 connects to conducting segments 47 and 48 of the adjacent segmented ring 49. Segments 50 and 51 are insulated from all circuits.

In the "A" position shown, insulated segment 50 of segmented ring 49 is in contact with brush elements 52 and 53. Connection is therefore not established from the circuit thus far described to wire 54, switch 27 and the direct current output terminal 40. This connection is not desired over the major portion of this period of time because the instantaneous polarity of secondary 6 is originally arranged to be in phase opposition to that of secondary 7. Should this connection be made, cancellation of the current flow results. I use this phenomenon for adjusting the output of my device and for sparkless commutation at the transitions of polarity of the alternating current wave in this invention, but in the gross consideration of each half cycle two segmented rings are conducting and two are non-conducting.

Similarly, terminal 55 of secondary 6 is connected through the right hand blade of switch 42 and wire 56 to brush 57, slip ring 58, wire 59 and segments 60 and 61. Again, insulated segment 62 of segmented ring 64 is in contact with brush elements 65 and 66. Connection is therefore not established from the circuit thus far described to wire 67, switch 27 and direct current output terminal 28. As before, this is not desired.

We next consider these connections a half electrical cycle later. By this time the rotating assembly has moved a quarter revolution from its previously described position. The new position is shown at B in Fig. 1, with the same structure as A shown directly below in each instance and the change in position of any part identified by a primed (') reference numeral.

Passing to the gist of the operation, brush elements 24, 25, in contact with segmented ring 16 now bear upon insulated segment 18', rather than upon conducting segment 14 as before. In a similar manner brush elements 36, 37 now bear upon insulated segment 69' rather than upon conducting segment 34 as before. This is necessary, of course, because now the instantaneous polarity of transformer secondary 7 is opposite to what it was when the rotating assembly was in position A and the polarity at output terminals 28 and 40 must not be reversed if rectification is to be accomplished.

Similarly, whereas brush elements 52, 53 and 65, 66 were upon insulated segments 50 and 62, these are now on conducting segments 48' and 61'. This results in current flow from secondary 6 flowing from terminal 55 through the right hand blade of switch 42 and wire 56, through brush 57, slip ring 58', wire 59', segment 61', brushes 65, 66, wire 67, the left hand blade of switch 27 to output terminal 28. The return path through the load is from terminal 40, right hand blade of switch 27, wire 54, brush elements 52, 53, segment 48', wire 46', slip ring 45', brush 44, wire 43, left hand blade of switch 42 to terminal 41 of transformer secondary 6. Thus, the transformer secondary with the same instantaneous polarity as before is connected to the same direct current terminals although the change in time requires that this be the opposite secondary to that previously connected.

The current flow with the rotating assembly at the instant of time corresponding to position A is designated in Fig. 1 with arrows and the letter A, whereas the same for instant and position B is designated by arrows B. By tracing these arrows on the diagram it will be noted that secondary 7 supplies the current flow through the left hand pair of ring groups at time A and secondary 6 is open-circuited. At time B secondary 6 supplies the current flow through the right hand pair of ring groups and secondary 7 is open-circuited.

A synchronous motor 70 is fed through switch 71 with electrical energy from terminals 1 and 2, thereby insuring synchronous rotation of the ring assembly. In schematic Fig. 1 this drive is shown by common center line 72. In practice a shaft and coacting bearings are employed as known to the art.

We turn now to Figs. 2 and 3 to show how a novel brush structure coacts with the circuit to accomplish the objects of my invention. The brush structure shown is utilized for each segmented ring, but in Figs. 2 and 3 the reference numerals used apply to the first segmented ring 16. The purpose of the brush structure is to allow adjustment of the brush length circumferentially of the segmented ring by circumferential movement of the brush elements.

In Fig. 2 it is clear that brush elements 24, 25 may be adjusted circumferentially of segmented ring 14 by rotation of pinion 75. This is a mechanical arrangement to alter the electrical length of a brush. Each brush element is normally of carbon and brush holders 76 and 77 surround the same with metal, such as bronze. These holders are slidably positioned in a frame or mounting 78 having a circumferential shape conforming to the ring 16 so that regardless of the position of the brush elements the same are radially disposed with respect to the circumference of the ring. This is necessary so that the full surface area of the brush elements are effective in contact with the ring regardless of the adjusted position. In Fig. 2 it will be noted that brush element 25 is forward of brush element 24, thus the former rides down on segment 14 in Fig. 3.

In the embodiment illustrated the brushes are both moved equally either side of a central position defined by center line 79. The synchronous rotation of the ring assembly is related to the alternations of the alternating current such that the center line represents the zero values of the current.

Frame 78 is formed with a center portion top and bottom to provide bearings for the shaft of pinion 75 and as additional track guides for the brush holders 76 and 77. The gear teeth on the pinion and in the sides of the brush holders are cut radially with respect to the center line of main shaft 80 so that these will mesh properly to accommodate the circumferential shape of the track guides in mounting 78. As shown in Fig. 3 this frame is cast with two bearing bosses 81 and 82, through which a shaft 83 turns. This shaft extends substantially the length of the rotating ring structure so that brush adjustment may be provided at each segmented ring; i. e., rings 16, 38, 49 and 64 in Fig. 1. At the center of each frame, shaft 83 is provided with worm screw threads 84 which engage worm gear 85, fastened, in turn, to the shaft of pinion 75. Thus, with rotation of shaft 83 in one direction all brush elements align to minimum circumferential length and in the other direction the elements depart toward a maximum circumferential length. The gross position of each frame 78 circumferentially of the segmented rings such as 16 in Fig. 3 is determined by the position of bar 86. This is insulated from but rigidly fastened to each frame along the rotating ring structure and is further disposed in the mechanical structure to accomplish circumferential rotation over a normally limited arc so that the gross position of the brushes may be made to coincide with the zero value of the alternating current. This phase of the mechanical structure is known to the art.

Leaf springs 87 and 88 are fastened to the brush holders and are initially mechanically biased to press the brushes 24 and 25 downward, thus maintaining necessary pressure of these elements upon ring 16.

Additional brush elements 24" and 25" are to be noted at the bottom of Fig. 3. These are diametrically opposite to brushes 24 and 25 and are provided with holders, frame, adjusting shaft and bar (not shown) the same as is shown at the top of Fig. 3. These additional brush elements are not required to make the circuit of Fig. 1 operative but the addition thereof doubles the current-carrying capacity of the rectifier. As has been previously mentioned a full electrical cycle is executed in a half revolution of the synchronously rotating structure.

Thus the same relation of segmented rings to brush position exists across a diameter with respect to the amplitude of the alternating current waveform. Brush elements 24" and 25" are merely connected to brush elements 24 and 25 with a suitable conductor and are thus electrically in parallel therewith.

Figure 4:
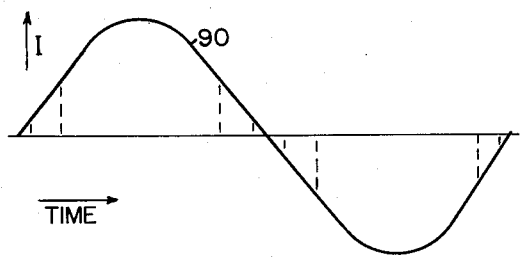
Fig. 4 shows electrical waveforms pertinent to the operation.

We turn now to Fig. 4 and a consideration of the effects of adjustment of brush elements 24, 25, etc. In Fig. 4 time is the abscissa and electric current I is the ordinate.

The first curve 90 shows an alternating current such as flows in secondary 7 should it be terminated in a resistor and no rectifying action takes place. Curve 91, below curve 90, shows a preferred current waveshape for substantially full output from my rectifier. This condition is obtained as follows. The circumferential lengths of the conducting segments, such as 14 and 15 on ring 16, are all equal and circumferentially shorter than a quarter circumference by the lengths of the brushes. Stated in another way, the circumferential difference in length between insulated and conducting segments is twice the circumferential length of the brush, with the insulated segment being the longer. With this relation, the conducting segment of one ring connected to one transformer secondary just leaves contact at the instant a conducting segment of another ring connected to the other transformer secondary makes contact.

To produce curve 91 the brushes are either constructed approximately ten percent longer circumferentially than just stated, or the adjustment of pinion 75 of Fig. 2 is such as to cause the composite length of the two brush elements to be ten percent greater than just stated. I prefer to employ this relation in this invention because it accomplishes sparkless operation. It has previously been mentioned that the two transformer secondaries are connected in phase opposition to the rotating ring structure and this opposition is arranged for any other two sources which might be substituted. In Fig. 1 this means that the phase at terminal 8, which passes through slip ring 12 and appears at brush elements 24, 25 is at all times equal and opposite to that of terminal 55, which passes through slip ring 58 and appears at brush elements 65, 66. During most of a half cycle of alternating current either one or the other of these brush element pairs are contacting a conducting segment on either segmented ring 16 or 64, but not on both, so that a succession of current half waves of the same polarity pass to output terminal 28. It is apparent, however, that should both brush element pairs make contact at once an equal and opposite voltage from transformer secondaries 6 and 7 would appear at each and thus there would be no current flow. This occurs while both pairs are in contact with conducting segments, thus the current flow is stopped by opposing voltages and not by parting of brushes and conducting segments.

I have found in a typical embodiment of this device that even the gross brush adjustment bar 86 of Fig. 3 can be purposely maladjusted during rectifier operation and no sparking results. So much more is proper operation retained by adjusting the brush elements to give a circumferentially longer brush by means of pinion 75, and the reason demonstrated for preferred operation according to curve 91 for maximum current output.

Adjustable output being another object of my invention, it is now seen that by increasing the effective circumferential length of the 24, 25 brush element pair by rotation of pinion 75 to an amount near the maximum excursion as shown in Fig. 2 that waveform 92 of Fig. 4 results, and this operation accomplished without sparking. A greater period of zero current 93 occurs in the vicinity of the instantaneously brief zero current of the usual sine wave waveform. Thus less average current is supplied to the output circuit. Ammeter 73 is included in series in this output circuit to indicate this variation for desired control by the operator and voltmeter 74 thereacross is a convenience in operation.

It is important to distinguish my opposing-voltage means for securing reduced current output while maintaining brush to conductive segment contact from those of the prior art in which a brush merely leaves a conducting surface for a non-conducting one. In such prior art the current is broken by the brush vs. conducting surface and serious sparking results.

In operating the rectifier it is desirable that switch 71 first be closed (Fig. 1) and synchronous motor 70 be allowed to first reach synchronous speed. For the segmented rings shown (four segments) the synchronous motor should have four poles and for an alternating current frequency of 60 cycles to revolve at 1800 revolutions per minute. Thereafter, switches 9 and 42 are closed and an expected voltage obtained upon voltmeter 74. Finally, switch 27 is closed, applying the direct current load, the current to which being noted by ammeter 73. The rectifier is taken out of operation by the reverse procedure.

It will be recognized that my new rectifying means is amenable to certain alternate embodiments. For simplicity it is possible to omit switches 9 and 42, also switch 71, using straight through wire connections instead. In such a modification particularly a switch is provided at terminals 1 and 2 by means of which these are connected or disconnected to the main power supply. In some instances, as where a direct current motor starts without load it is possible to dispense with all switches save the one for terminals 1 and 2. Because of the self-opposing character of my transformer secondaries damaging currents will not flow while the rectifier is reaching synchronous speed. Instruments 73 and 74 are not absolutely necessary for the operation of my device and thus may be omitted as a matter of economy.

While I have shown means to move both brushes equally away from the zero current point in Figs. 2 and 3, it is also possible to accomplish control by moving only one brush element. I prefer to have the stationary element slightly longer circumferentially than either of the previously shown elements 24, 25 so that a minimum value of the zero period similar to waveform 91 is secured to insure sparkless operation. When only one brush element is moved the longer zero current period 93 of waveform 92 does not occur symmetrically with respect to the zero amplitude point of waveform 90, but asymmetrically with respect thereto. At reduced current output with this alternate the waveform remains the same shape near zero current as waveform 91 at one end of each half cycle but is considerably shortened as per wave form 92 at the other end of each half cycle. Mechanically, pinion 75 may be placed to one side of the movable brush and the pair of brush elements placed close together axially along shaft 80.

It will be further understood that three brushes may be positioned and adjusted according to the teaching of Figs. 2 and 3, one brush being stationary and centered at the zero current position while the other two brush elements move away therefrom as elements 24 and 25 shown.

For other alternates, two segments per segmented ring can be employed according to the teaching that the insulated segment is longer than the conducting segment by twice the circumferential length of the normal brush and a two pole synchronous motor is used. Similarly, with six segments per segmented ring a six pole synchronous motor is used and so on. Within the limits of proper mechanics as concerns centrifugal force my rectifier may be used on any frequency of alternating current, for example, on 400 cycles per second as used in aeronautical electrical system, etc.

Polyphase models may be constructed by merely adding another group of rings 12 to 32 and 45 to 58 for each additional phase and additional transformers 3 connected one to each incoming phase and to one group of rings. The different groups of rings are oriented at suitable mechanical angles corresponding to the electrical angles of the several phases and a polyphase synchronous motor is preferably utilized at 70. For three phase alternating current, three transformers 3 are employed, three groups of rings at 120° between corresponding points on the circumferences of corresponding rings and a three phase motor 70. The relation between the number of segments per segmented ring and the number of poles per motor remains the same as previously given for single phase electrical energy.

Other variations in constructional details, sizes and proportions and circuit arrangement may be made without departing from the teaching of my invention.

Having now fully described my invention and the manner in which it is to be practiced, I claim:

1. A rectifier comprising a synchronously rotating assembly of segmented rings having alternately disposed conducting and insulated segments, separate sources of alternating electrical current to be rectified, means to connect each said source to the conducting segments of a pair of said segmented rings, a brush bearing upon each of said segmented rings circumferentially related to said conductive segments to rectifyingly connect said sources to the rectified output circuit of said rectifier; each of said brushes formed of a plurality of brush elements, means to circumferentially adjust at least one of said brush elements in each plurality to vary the effective circumferential length of each of said brushes, said means to adjust adapted to vary said circumferential length of said brush from a value of said circumferential length plus the circumferential length of a conducting segment approximately equal to the circumferential travel at synchronous speed corresponding to half an electrical cycle of alternating current to be rectified to a length for which the combined circumferential length described is greater than that corresponding to half an electrical cycle, said latter length connecting said sources in phase opposition in pairs with respect to said output circuit for a fraction of each said half electrical cycle.

2. A synchronous electrical rectifier comprising a rotating assembly of segmented rings having alternately disposed conducting and insulated segments, separate sources of alternating electrical current to be rectified, means to connect each said source to the conducting segments of a pair of said segmented rings, means to rotate said assembly in synchronism with said alternating current, a brush bearing upon each of said segmented rings circumferentially related to said conductive segments to rectifyingly connect said sources to the rectified output circuit of said rectifier; each of said brushes formed of a pair of brush elements, means to circumferentially adjust at least one of said brush elements in each pair to vary the effective circumferential length of each of said brushes, said means to adjust adapted to vary said circumferential length of said brush from a value of said circumferential length plus the circumferential length of a conducting segment slightly greater than the circumferential travel at synchronous speed corresponding to half an electrical cycle of alternating current to be rectified to a length for which the combined circumferential length described is considerably greater than that corresponding to half an electrical cycle, said latter length connecting said sources in phase opposition in pairs with respect to said output circuit for a fraction of each said half electrical cycle to accomplish sparkless commutation and to reduce the period of current flow over each said half electrical cycle.

3. A synchronous rectifier comprising a rotating assembly of slip rings, and of segmented rings having alternately disposed conducting and insulated segments, separate sources of alternating electrical current to be rectified, means to connect each said source to the conducting segments of a pair of said segmented rings through said slip rings, means to rotate said assembly in synchronism with said alternating current, a brush connected to the rectified output circuit of said rectifier bearing upon each of said segmented rings and circumferentially related to said conductive segments to rectifyingly connect said sources to said output circuit; each of said brushes formed of a pair of brush elements having a mounting, means to circumferentially adjust at least one of said brush elements in each pair to vary the effective circumferential length of each of said brushes, said means to adjust adapted to vary said circumferential length of said brush from a value of said circumferential length plus the circumferential length of a conducting segment substantially equal to the circumferential travel at synchronous speed corresponding to half an electrical cycle of alternating current to be rectified to a length for which the combined circumferential length described is considerably more than that corresponding to half an electrical cycle, said latter length connecting said sources in phase opposition in pairs with respect to said output circuit for a fraction of each said half electrical cycle to accomplish sparkless commutation and to reduce the period of current flow over each said half electrical cycle to regulate the electrical energy delivered to said output circuit.

4. The rectifier of claim 3 in which the mounting for the pair of brush elements is comprised of an arcuate frame, a pair of brush element holders adapted to slide within said frame, positive means between said holders to move said holders upon the rotation of said positive means, and further means to simultaneously rotate plural said positive means.

5. The rectifier of claim 3 in which the mounting for the pair of brush elements is comprised of an arcuate frame, a holder for each brush element, each said holder adapted to slide within said frame, gear teeth upon one side of each holder adjacent the other holder, a pinion mounted in said frame between said holders and engaging said teeth, a gear attached to said pinion, and a worm meshing with said gear, the recited structure adapted to move said brush elements circumferentially of the segmented ring coacting with said elements upon actuation of said worm.

6. A three phase synchronous rectifier comprising a rotating assembly of twelve slip rings and of twelve segmented rings, said segmented rings having alternately disposed conducting and insulated segments, three separate sources of alternating electrical current to be rectified, means to connect each said source to the conducting segments of a pair of said segmented rings through said slip rings, means to rotate said assembly in synchronism with said alternating current, a brush bearing upon each of said segmented rings circumferentially related to said conductive segments to rectifyingly connect said sources to the rectified output circuit of said rectifier; each of said brushes formed of a pair of brush elements, means to circumferentially adjust at least one of said brush elements in each pair to vary the effective circumferential length of each of said brushes, said means to adjust adapted to vary said circumferential length of said brush from a value of said circumferential length plus the circumferential length of a conducting segment substantially equal to the circumferential travel at synchronous speed corresponding to half an electrical cycle of alternating current to be rectified to a length for which the combined circumferential length described is considerably more than that corresponding to half an electrical cycle, said latter length connecting said sources in phase opposition in pairs with respect to said output circuit for a fraction of each said half electrical cycle to accomplish sparkless commutation and to reduce the period of current flow over each half electrical cycle to regulate the electrical energy delivered to said output circuit.

7. A synchronous rectifier comprising a rotating assembly of slip rings and of segmented rings, said segmented rings having alternately disposed conducting and insulated segments, separate phase-opposed sources of alternating electrical current to be rectified, means to connect each said source to the conducting segments of a pair of said segmented rings through said slip rings, means to rotate said assembly in synchronism with said alternating current to be rectified, a brush bearing upon each of said segmented rings circumferentially related to said conductive segments to periodically connect said sources to the rectified output circuit of said rectifier and also related to the synchronous rotation of said assembly to accomplish commutation from one source to another at the minimum value of the current being rectified; each said brushes formed of a pair of brush elements and a mounting, means between each corresponding said mounting to allow circumferential adjustment thereof with respect to the segments of said segmented rings, further means to circumferentially move at least one of said brush elements in each pair of elements to vary the effective circumferential length of each of said brushes, said further means adapted to vary said circumferential length of said brush from a value of said circumferential length plus the circumferential length of a said conducting segment approximately equalling the circumferential travel at synchronous speed corresponding to one-half an electrical cycle of alternating current to be rectified to the condition in which the combined circumferential length described is considerably more than that corresponding to one-half of said electrical cycle, said latter condition connecting said sources in phase opposition in pairs with respect to said output circuit for a part of each said one-half electrical cycle to accomplish sparkless commutation and to reduce the period of current flow over each said one-half electrical cycle to adjust the amount of electrical energy delivered to said output circuit.

8. A rotating synchronous rectifier comprising a rotating assembly of slip rings, and of segmented rings having alternately disposed conducting and insulated segments, said insulated segments being longer than said conducting segments, a connection from each slip ring to said conducting segments of a segmented ring, a transformer having separate phase-opposed secondary windings, means to connect one slip ring to one end of each secondary winding, means to rotate said assembly in synchronism with alternating current to be rectified, a brush bearing upon each of said segmented rings circumferentially related to said conductive segments to effect substantially separate connection of said secondary windings to the rectified energy output of said rectifier and also related to the synchronous rotation of said assembly to accomplish commutation from one secondary to another at substantially the minimum value of the current being rectified; each of said brushes formed of a plurality of brush elements and a mounting, means between each corresponding said mounting to allow circumferential adjustment thereof with respect to the segments of said segmented rings, toothed means to circumferentially move at least one of said elements in each said plurality to vary the effective circumferential length of each of said brushes, said toothed means adapted to vary said circumferential length of said brush from a value of said circumferential length plus the circumferential length of a said conducting segment equalling the circumferential travel at synchronous speed corresponding to one-half an electrical cycle of alternating current to be rectified to the condition in which the combined circumferential length described is considerably more than that corresponding to one-half of said electrical cycle, said latter condition connecting said secondary windings in phase opposition in pairs with respect to said output circuit for a part of each said one-half electrical cycle to accomplish sparkless commutation and to reduce the period of current flow over each said one-half electrical cycle to determine the electrical energy delivered to said output circuit.

9. A rotating synchronous rectifier comprising a rotating assembly of slip rings, and of segmented rings having alternately disposed conducting and insulated segments, said segments of one pair of segmented rings aligned and said segments of another pair oppositely aligned with respect to said first pair, said insulated segments being longer than said conducting segments, a connection from each slip ring to said conducing segments of a segmented ring, a transformer having separate phase-opposed secondary windings, means to connect one slip ring to one end of each secondary winding, means to rotate said assembly in synchronism with alternating current to be rectified, a brush bearing upon each of said segmented rings circumferentially related to said conductive segments to effect alternate connection of said secondary windings to the rectified energy output circuit of said rectifier and also related to the synchronous rotation of said assembly to accomplish commutation from one secondary to another at the minimum value of current being rectified; each of said brushes formed of two brush elements, each said two elements having a mounting, means between each corresponding said mounting to allow circumferential adjustment thereof with respect to the segments of the segmented rings, toothed means to circumferentially move at least one of said brush elements in each pair of brush elements to vary the effective circumferential length of each of said brushes, said toothed means adapted to vary said circumferential length of said brush from a value of said circumferential length plus the circumferential length of a said conducting segment slightly more than the circumferential travel at synchronous speed corresponding to one-half an electrical cycle of alternating current to be rectified to the condition in which the combined circumferential length described is considerably more than that corresponding to one-half of said electrical cycle, said latter condition connecting said secondary windings in phase opposition in pairs with respect to said output circuit for a part of each said one-half electrical cycle to accomplish sparkless commutation and to reduce the period of current flow over each said one-half electrical cycle to adjust the magnitude of electrical energy delivered to said output circuit.

10. A three phase rotating synchronous rectifier comprising a rotating assembly of three groups of four slip rings, and of three groups of four segmented rings having alternately disposed conducting and insulated segments, in each said group said segments of one pair of segmented rings aligned and said segments of the other pair oppositely aligned with respect to said first pair, said segments aligned a third of a full circumference apart from group to group, said insulated segments being longer than said conducting segments, a connection from each slip ring to said conducting segments of a segmented ring, three transformers each having two separate phase-opposed secondary windings, each transformer connected to one phase of alternating current to be rectified, means to connect one slip ring to one end of each secondary winding, means to rotate said assembly in synchronism with said current to be rectified, a brush bearing upon each of said segmented rings circumferentially related to said conductive segments to effect selective connection of said secondary windings to the rectified energy output circuit of said rectifier and also related to the synchronous rotation of said assembly to accomplish commutation from one secondary to another at the minimum value of the current being rectified; each of said brushes formed of a pair of brush elements having a mounting, means between each corresponding said mounting to allow circumferential adjustment thereof with respect to the segments of said segmented rings, toothed means to circumferentially move at least one of said brush elements in each pair to vary the effective circumferential length of each of said brushes, said toothed means adapted to vary said circumferential length of said brush from a value of said circumferential length plus the circumferential length of a said conducting segment equalling the circumferential travel at synchronous speed corresponding to one-half an electrical cycle of alternating current to be rectified to the condition in which the combined circumferential length described is considerably more than that corresponding to one-half of said electrical cycle, said latter condition connecting said secondary windings in phase-opposition in pairs with respect to said output circuit for a part of each said one-half electrical cycle to accomplish sparkless commutation and to reduce the period of current flow over each said one-half electrical cycle to adjust the magnitude of electrical energy delivered to said output circuit.

11. A rotating synchronous rectifier comprising a rotating assembly of slip rings and of segmented rings having circumferentially oppositely disposed conducting and insulated segments, said segments of one pair of segmented rings aligned and said segments of another pair oppositely aligned with respect to the first pair, said insulated segments being circumferentially longer than said conducting segments, a connection from each slip ring to said conducting segments of one segmented ring, a brush bearing upon each of said segmented rings, one brush bearing upon each slip ring, a transformer having unconnected phase-opposed secondary windings, each brush of each slip ring connected to one end of one secondary winding, means to rotate said assembly in synchronism with alternating current to be rectified, said brushes bearing upon said segmented rings and said conductive segments circumferentially related to affect alternate connection of said secondary windings to the rectified energy output circuit of said rectifier and further related to the synchronous rotation of said assembly to accomplish commutation from one secondary to the other at the minimum value of the current being rectified; each of said brushes bearing upon said segmented rings being formed of two brush elements, each pair thereof having a frame, mechanical connecting means between each corresponding said frame to allow circumferential adjustment of said frames with respect to the segments of said segmented rings, means to circumferentially move at least one of said brush elements in each pair of brush elements to vary the effective circumferential length of each said brush, said means to move adapted to vary said circumferential length of said brush from a value of said circumferential length plus the circumferential length of a said conducting segent equalling the circumferential travel at synchronous speed corresponding to one-half an electrical cycle of said alternating current to be rectified to the condition in which the combined circumferential length described corresponds to considerably more than that corresponding to one-half of said electrical cycle, said latter condition connecting said secondary windings in phase opposition with respect to said output circuit for a portion of each said one-half electrical cycle to accomplish sparkless commutation and to reduce the period of current flow over each said one-half electrical cycle to adjust the magnitude of electrical energy delivered to said output circuit.

12. A rotating synchronous rectifier comprising a rotating assembly of slip rings, and of segmented rings having circumferentially oppositely disposed two conducting and two insulated segments, said segments of pairs of segmented rings aligned and said segments of other pairs oppositely aligned with respect to the first pair, said insulated segments being circumferentially longer than said conducting segments, a connection from each slip ring to said conducting segments of one segmented ring of said assembly, oppositely disposed brushes bearing upon each of said segmented rings, a brush bearing upon each slip ring, a transformer having two conductively unconnected phase-opposed secondary windings, each brush of each slip ring connected to one end of one secondary winding, electrical means to rotate said assembly in synchronism with alternating current to be rectified, said oppositely disposed brushes and said conductive segments circumferentially related to effect alternate connection of said secondary windings to the rectified energy output circuit of said rectifier and further related to the synchronous rotation of said assembly to accomplish commutation from one secondary to the other at the minimum value of the current being rectified; each of said oppositely disposed brushes formed of two brush elements bearing upon said segmented rings, a separate mounting for each pair of brush elements of each said oppositely disposed brushes, mechanical connecting means between each corresponding said mounting to allow circumferential adjustment of said mountings with respect to the segments of said segmented rings, ganged positive mechanical means to circumferentially move both of said brush elements in each brush element group to vary the effective circumferential length of each said oppositely disposed brushes, said ganged means adapted to vary said effective circumferential length of said brush from a value of said circumferential length thereof plus the circumferential length of a said conducting segment slightly exceeding the circumferential travel at synchronous speed corresponding to one-half an electrical cycle of said alternating current to be rectified to the condition in which the combined circumferential length described corresponds to considerably more than that corresponding to one-half of said electrical cycle, said latter condition connecting said secondary windings in phase opposition with respect to said output circuit for a portion of each said one-half electrical cycle to accomplish reduction of the period of current flow over each one-half cycle.

13. A rotating synchronous rectifier comprising a rotating assembly of four slip rings, and of four segmented rings having circumferentially opposed two conducting and two insulated segments, said segments of one pair of segmented rings aligned and said segments of the other pair oppositely aligned with respect to the first pair, said insulated segments being circumferentially longer than said conducting segments, a connection from each slip ring to said conducting segments of one segmented ring of said assembly, a brush bearing upon each of said segmented rings, one brush bearing upon each slip ring, a transformer having two conductively unconnected phase-opposed secondary windings, each slip ring brush connected to one end of one secondary winding, an electric motor to rotate said assembly in synchronism with alternating current to be rectified, the brushes bearing upon said segmented rings and said conductive segments thereof circumferentially related to alternately connect said secondary windings to the rectified energy output circuit of said rectifier and further related to the synchronous rotation of said assembly to accomplish commutation from one secondary to the other at the minimum value of the current being rectified; each of the brushes bearing upon said segmented rings being formed of two brush elements, each pair having a mounting, mechanical connecting means between each corresponding brush element mouting to allow circumferential adjustment of said mountings with respect to the segments of said segmented rings, gear-like means to oppositely and circumferentially move both of said brush elements to vary the effective circumferential length of each of said brushes bearing upon said segmented rings, said gear-like means adapted to vary said circumferential length of said brush from a value of said circumferential length plus the circumferential length of a said conducting segment equalling the circumferential travel at synchronous speed corresponding to one-half an electrical cycle of said alternating current to be rectified to the condition in which the combined circumferential length described corresponds to considerably more than that corresponding to one-half of said electrical cycle, said latter condition connecting said secondary windings in phase opposition with respect to said output circuit for a portion of each said one-half electrical cycle to accomplish sparkless commutation and to reduce the period of current flow over each said one-half electrical cycle to adjust the average magnitude of electrical energy delivered to said output circuit.

14. A single phase rotating synchronous rectifier comprising a rotating assembly of four slip rings, and of four segmented rings having circumferentially oppositely disposed two conducting segments and two insulated segments, said segments of one pair of adjacent segmented rings aligned and said segments of the other adjacent pair oppositely aligned with respect to the first pair, said insulated segments being circumferentially longer than said conducting segments, a connection from each slip ring to said conducting segments of one segmented ring of said assembly, oppositely disposed brushes bearing upon each of said segmented rings, one brush bearing upon each slip ring, a single phase transformer having two conductively unconnected phase-opposed secondary windings, each brush of each slip ring connected to one end of one said secondary winding, a synchronous electric motor to rotate said assembly in synchronism with the single phase alternating current to be rectified, said oppositely disposed brushes and said conducting segments circumferentially related to alternately connect said secondary windings to the rectified energy output circuit of said rectifier and further related to the synchronous rotation of said assembly to accomplish commutation from one secondary to the other at the minimum value of the current being rectified; each of said oppositely disposed brushes being formed of two brush elements bearing upon said segmented rings, a separate frame for each pair of brush elements of each oppositely disposed brushes, mechanical connecting means between each corresponding said frame to allow circumferential adjustment of said frames with respect to the segments of said segmented rings, ganged gear means to circumferentially and oppositely move both of said brush elements in each pair to vary the effective circumferential length of each said oppositely disposed brushes, said ganged gear means adapted to vary said effective circumferential length of said brush from a value of said circumferential length plus the circumferential length of a said conducting segment slightly greater than the circumferential travel at synchronous speed corresponding to one-half an electrical cycle of said alternating current to be rectified to the condition in which the combined circumferential length described corresponds to considerably greater than that corresponding to one-half of said electrical cycle, said latter condition connecting said secondary windings in phase opposition with respect to said output circuit for a portion of each said one-half electrical cycle to accomplish sparkless commutation and to reduce the period of current flow over each said one-half electrical cycle to adjust the average magnitude of electrical energy delivered to said output circuit.

References Cited in the file of this patent

UNITED STATES PATENTS

| | | |
|---|---|---|
| 129,085 | Barjon | July 16, 1872 |
| 1,183,196 | Heany | May 16, 1916 |
| 2,686,286 | Owen | Aug. 10, 1954 |
| 2,756,293 | Bitler | July 24, 1956 |